Feb. 7, 1956 M. B. LAYNE ET AL 2,733,627
WORK HOLDING TOOL
Filed June 5, 1950 5 Sheets-Sheet 2
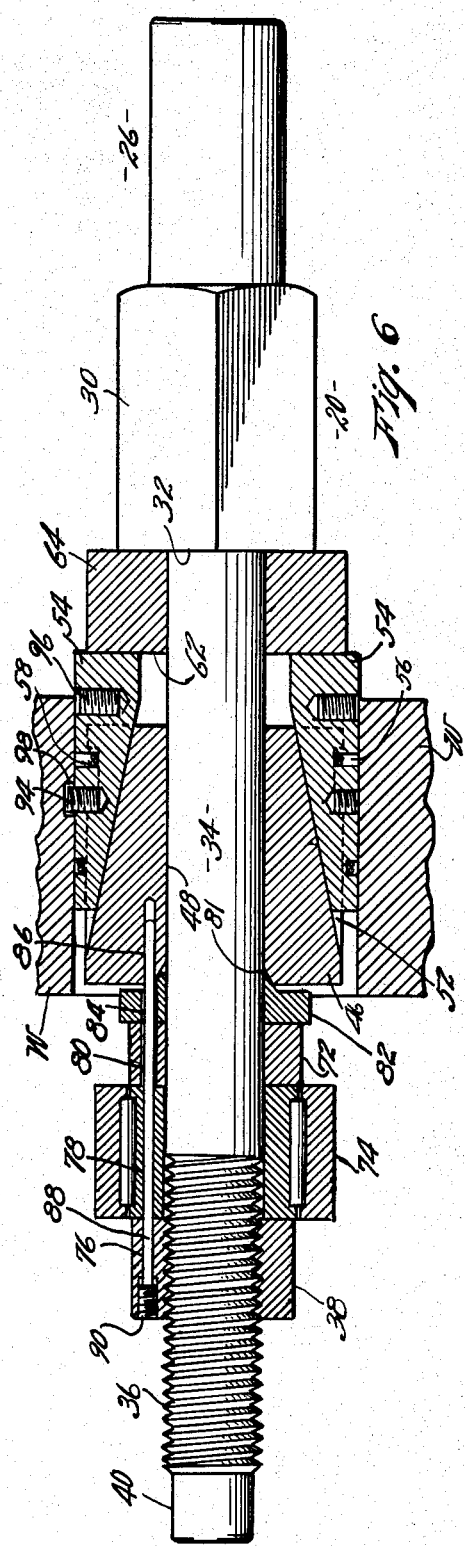
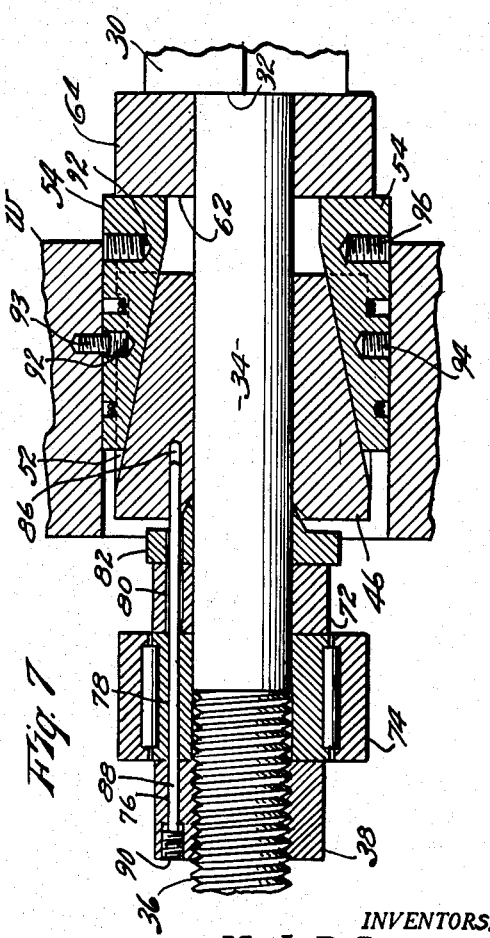
INVENTORS.
*Mark B. Layne,*
BY *Lawrence L. Heid.*
*Hamilton & Hamilton,*
Attorneys.

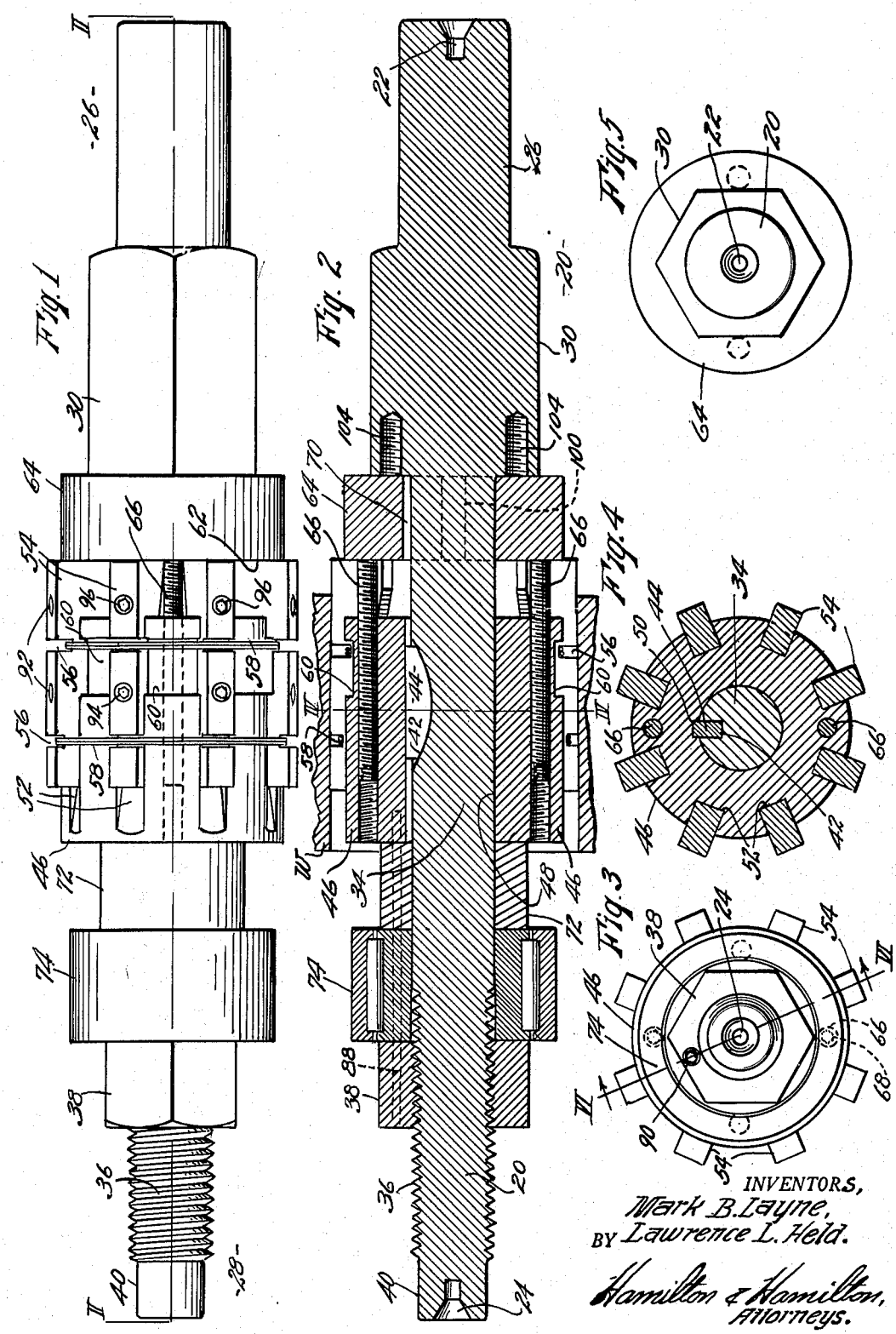

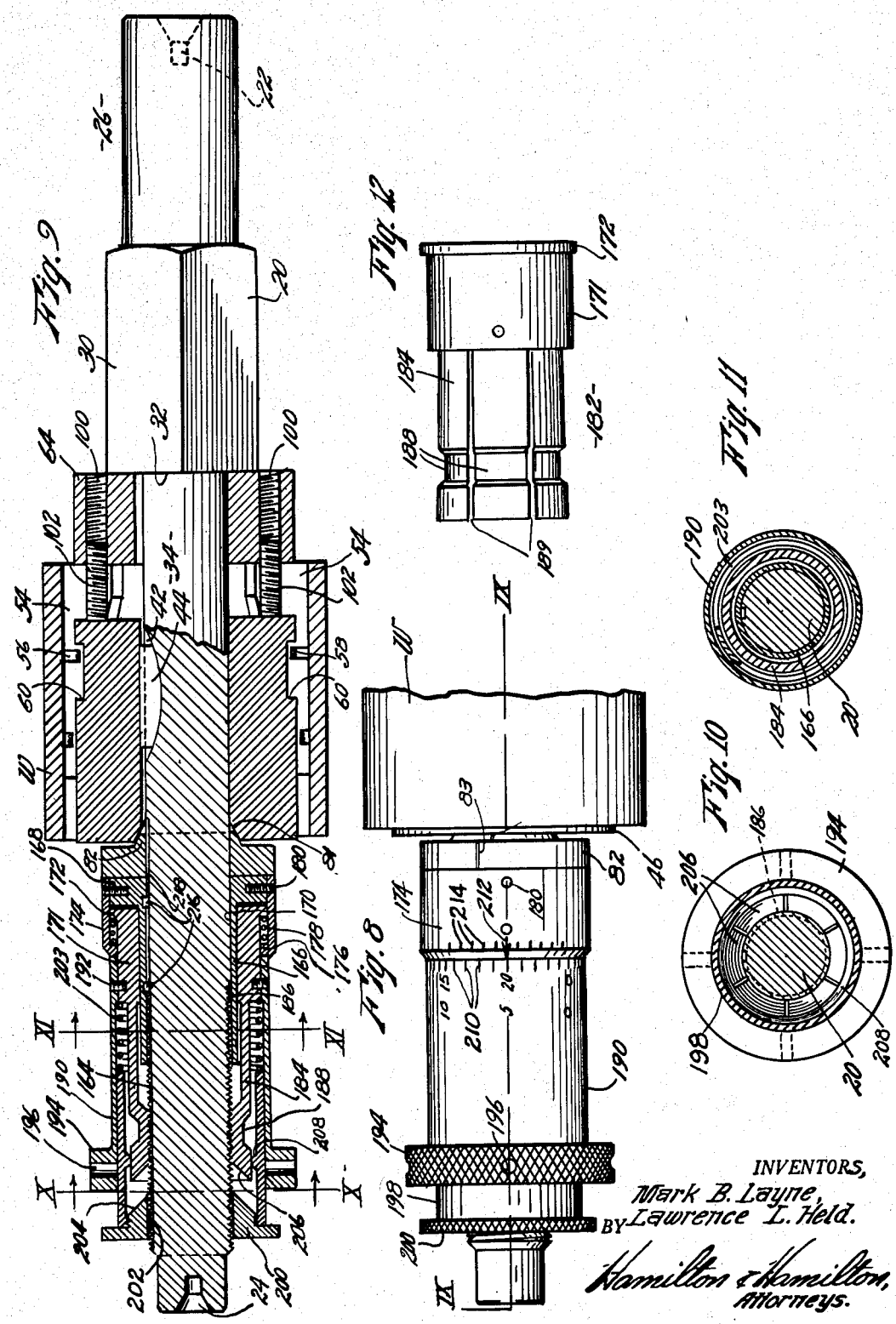

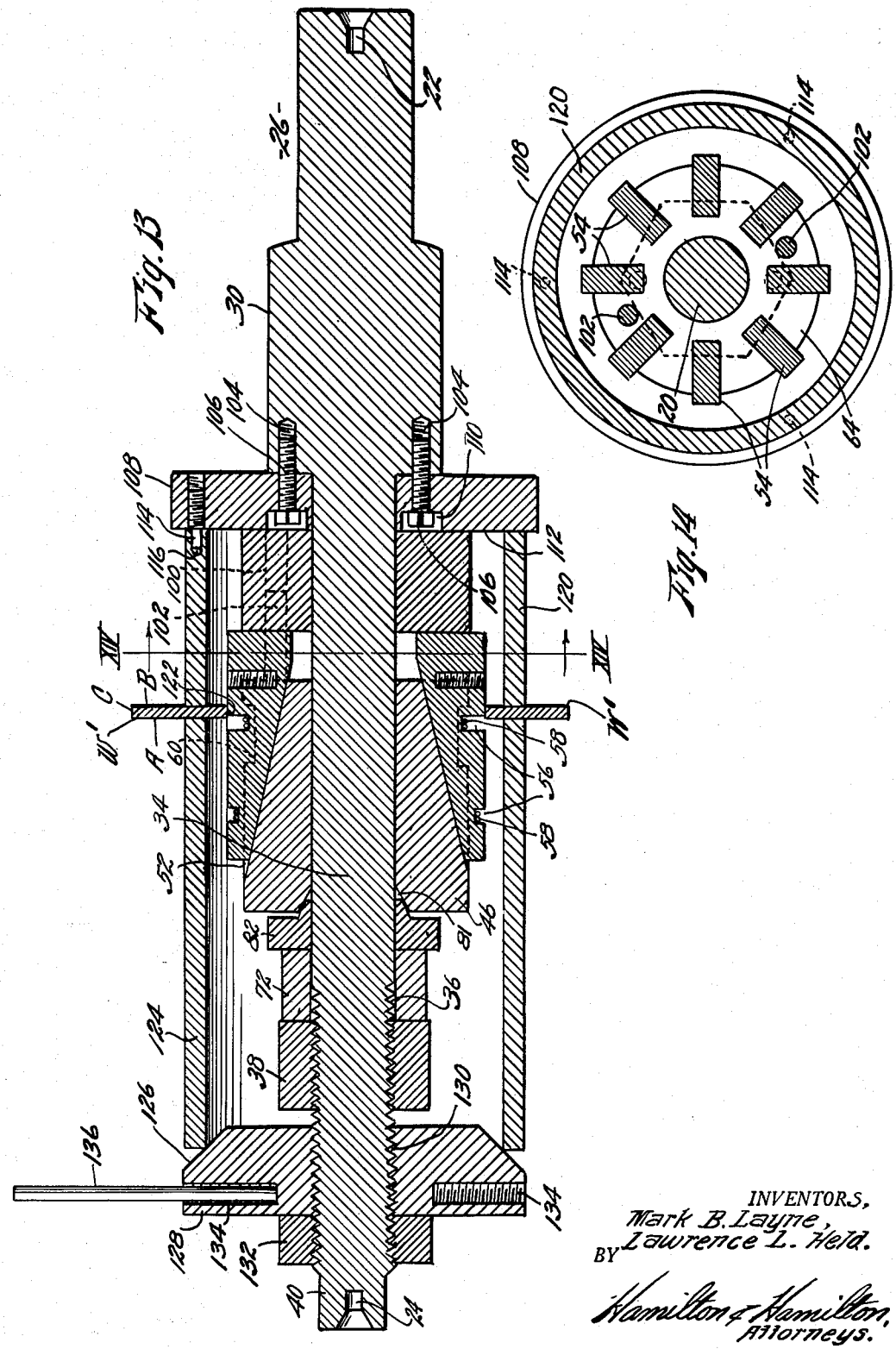

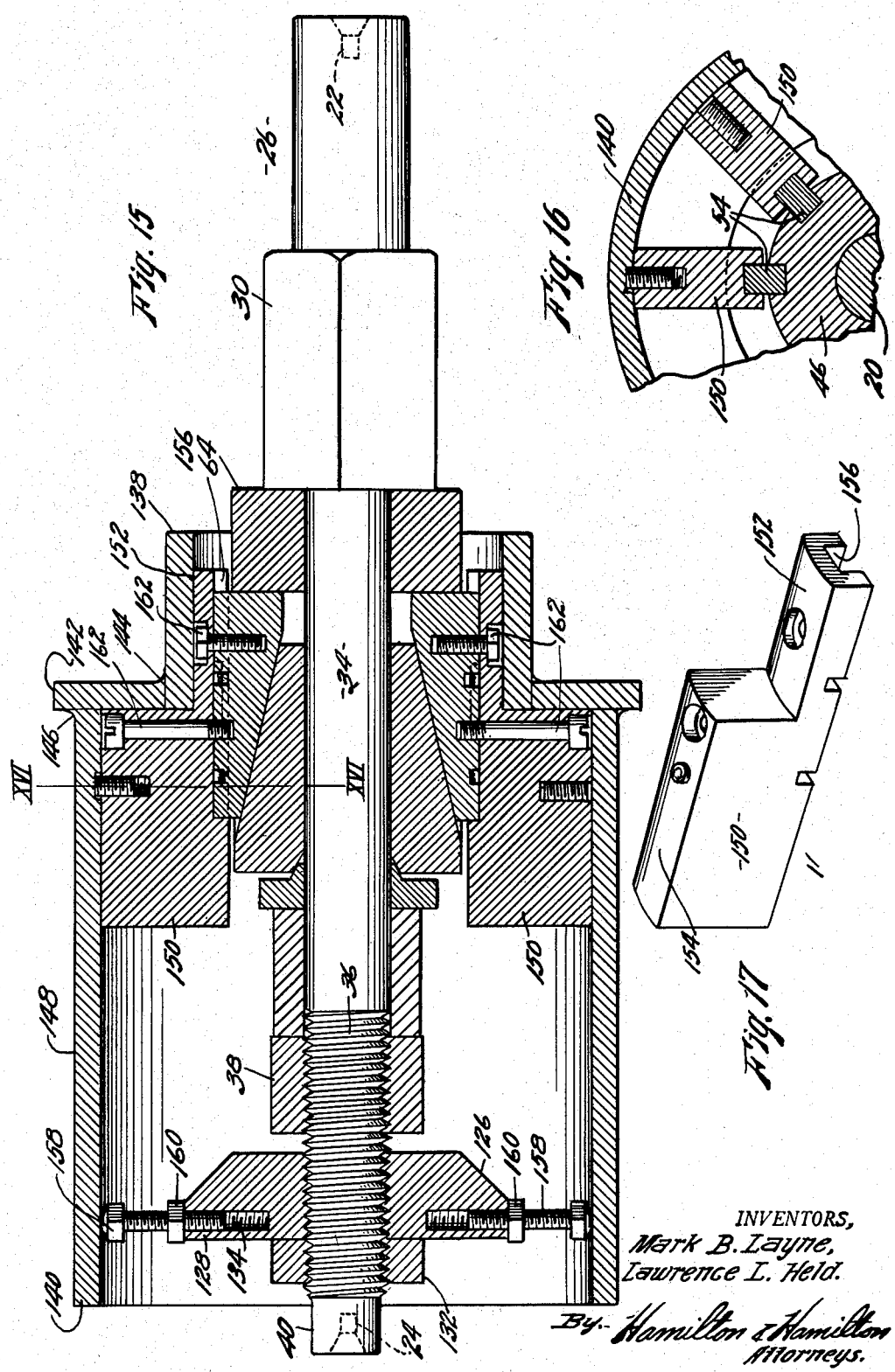

United States Patent Office 2,733,627
Patented Feb. 7, 1956

2,733,627

WORK HOLDING TOOL

Mark B. Layne and Lawrence L. Held, Higginsville, Mo., assignors to Layne-Held Corporation, Higginsville, Mo., a corporation of Missouri Application June 5, 1950, Serial No. 166,098

6 Claims. (Cl. 82—44)

This invention relates to improvements in work holding tools, and refers more particularly to a mandrel having work centers receiving recesses and also having a cylindrical body area suitable for operating in the ordinary work rest of a lathe to stabilize the load when heavy work is being done.

The principal object of this invention is the provision of a work holding tool including a mandrel having a smooth cylindrical central section threaded at its one end and having an abutment at its opposite end, a body member mounted on said central section, and means interconnecting said mandrel and body member to prevent relation rotation and to permit relative longitudinal movement of the parts, a series of wedge members slidably mounted in said body member and resting against said abutment, a threaded member operatively mounted on the threaded portion of said mandrel and operable to force said body member longitudinally relative to said wedges whereby said wedges are forced apart radially to engage work positioned thereon.

A tool of the general type described having a means whereby the work engaging parts will be secured against longitudinal movement as they are being moved radially to the gripping position.

A tool of the general type described having expandable wedges for engaging the work and adjustable inner clamping means spaced longitudinally from said wedges operable to engage and support remote portions of said work.

A tool of the class described having a body member movable longitudinally relative to the radially movable clamping wedges and screws operable from either end of said tool to limit the longitudinal movement of said body member.

A tool of the class described having radially movable wedge members for securing work to said tool, and jigs carried by said wedges adapted to conform to and grip special work as said wedges are moved radially to the gripping position.

A tool of the class described having radially movable work gripping wedges including means whereby when said wedges are moved to the work engaging position a detent will be moved to interengage said work and said wedges to prevent relative rotation thereof.

A work holding tool of the type described having radially movable wedges operable to grip the inner cylindrical wall of a piece of work, including means whereby a sliding movement of the wedge operating means will set said wedges in holding position for immediate tightening.

Other objects are simplicity and economy of construction, ease and efficiency of operation, and adaptability for use in carrying out various operations under conditions requiring inner pressure to properly hold the desired work.

With these objects in view as well as other objects which will appear during the course of the specification reference will be had to the drawings wherein:

Fig. 1 is an elevational view of a work holding tool embodying this invention.

Fig. 2 is a longitudinal central sectional view taken on line II—II of Fig. 1.

Fig. 3 is an end view of the tool looking at the tail stock end.

Fig. 4 is a cross sectional view taken on line IV—IV of Fig. 2.

Fig. 5 is an end view of the tool looking at the head stock end.

Fig. 6 is a sectional view taken on line VI—VI of Fig. 3 with the mandrel left in elevation, and with detents carried by the wedges positioned in recesses in the body of the work to prevent relative rotary movement of the work and the tool, and including a ball and socket joint.

Fig. 7 is a fragmentary view of Fig. 6 with a detent mounted in the work to engage in a recess formed in the work holding tool.

Fig. 8 is a fragmentary view of a work holding tool provided with radial expanding section and provided with a split nut means for rapid setting and releasing.

Fig. 9 is a longitudinal sectional view taken on line IX—IX of Fig. 8.

Fig. 10 is a cross sectional view taken on line X—X of Fig. 9.

Fig. 11 is a cross sectional view taken on line XI—XI of Fig. 9.

Fig. 12 is an elevational view of the split nut.

Fig. 13 is a longitudinal sectional view of the work holding tool showing the adaptation of the tool for holding especially thin work for finishing.

Fig. 14 is a cross sectional view taken on line XIV—XIV of Fig. 13.

Fig. 15 is a longitudinal section of a work holding tool having a series of radially adjustable wedges carrying circumferentially spaced parallel pressure members adapted to engage the walls of an opening in the work.

Fig. 16 is a fragmentary sectional view taken on line XVI—XVI of Fig. 15.

Fig. 17 is a perspective view of one of the wedge extension plates or jig used to support work parts of greater internal diameter than those that might be held by the regular wedge members.

Throughout the several views like reference characters refer to similar parts and the numeral 20 designates a mandrel having axially disposed recesses 22 and 24 disposed respectively in its head stock end 26 and tail stock end 28 whereby the mandrel may be operatively mounted between lathe centers. The head stock end is turned cylindrically and is adapted to be gripped by a chuck or a similar gripping tool. Adjacent 26 is an enlarged hexagonal section 30 which serves as a wrench anchor and also provides a shoulder or abutment member 32 adjacent the reduced central section 34 of the mandrel which is substantially cylindrical in form. The tail stock end portion is threaded at 36 to receive a nut 38 which serves to adjust the work holding parts as hereinafter fully set forth. The extreme tail stock end 40 is turned cylindrically to a diameter at the base of threads 36 to receive the threaded nuts thereover and to be positioned in a collet or chuck. The central section 34 is grooved at 42 to receive the Woodruff key 44.

A cylindrical body member 46 is provided with an axial bore 48 whereby it is adapted to slide over threads 36 and onto the central cylindrical section 34. A keyway 50 formed in 46 is adapted to receive the Woodruff key 44 to secure the body member against rotation relative to the mandrel.

The peripheral surface of the body member is longitudinally grooved at 52 in equally spaced distances about its circumference. These grooves are evenly tapered from one end of the body member to present grooves of identical contour. Eight grooves are shown, however it is apparent that a larger or smaller number might be used if it is so desired. To obtain the best results it is found most desirable to arrange the grooves in pairs arranged in diametrically spaced apart relation.

Carried slidably in each of said grooves is an elongated wedge 54 having its inner surface tapered in like degree as the base of the groove so that its outer surface is at all times parallel with the axis of the mandrel and of the body member. When the shallow ends of said grooves are moved toward the large ends of the wedges, their outer edge surfaces will be moved outwardly from the body member like radial distances to engage the work as hereinafter described, and when the deeper ends of said grooves are moved toward the thin ends of the wedges they will be moved inwardly toward the axis of the mandrel to disengage the work. The wedges 54 are transversely notched at 56 to receive split ring 58 about body member 46 and are made of resilient material and are adapted to urge the wedges into said grooves at all times regardless of their radial position in the grooves. The notches 56 are of sufficient depths to always maintain the split rings in a diameter less than the diameter of the circle determined by the outer surfaces of the wedges so as to not interfere with the gripping action of the wedges. A relatively wide groove 60 is formed in the body member 46 adjacent the deeper ends of the grooves for accommodating split ring 58 and permitting limited longitudinal movement of the body member relative to the wedges.

Wedges 54 are so constructed as to extend at all times from the deep ends of grooves 52 to contact the inner wall 62 of sleeve 64 which snugly fitted on mandrel section 34 against shoulder 32.

Threaded into body member 46 at equally spaced distances between grooves 52 is a plurality of limiting screws 66 which are adapted to be projected a predetermined distance from the end of the body member theretoward whereby the radial projections of the wedges are limited. The end portion of each screw 66 is provided with the usual non circular recess 68 whereby it can be properly adjusted in the body member. Referring to Fig. 2 it will be noted that sleeve 64 is internally grooved at 70 to permit its movement over key 44 to a position therebeyond. Spaced outwardly from body member 46 on mandrel 20 by sleeve 72 is a roller bearing 74 which is bored to fit over threads 36 and to be tightly gripped by nut 38. This roller bearing is adapted to be positioned in the lathe work rest (not shown) to stabilize the tool in heavy work or when heavy cuts are to be made. With a mandrel having the smooth central section with a key 44 mounted therein it is apparent that the tool can be set at a predetermined holding diameter which will remain constant until the nut 38 is manually adjusted to another desired holding diameter.

Referring now especially to Figs. 3, 6, and 7 it will be noted that nut 38 is bored at 76, roller bearing is bored at 78, sleeve 72 at 80, ball collar 82 which is split at 83 is bored at 84, and the body member 46 is bored at 86. These bored holes are all in axial alignment parallel with the axis of the mandrel 20 and adapted to receive the pin 88 which secures all these associated parts in proper alignment against relative rotation.

When this driving pin 88 is set and key 44 is removed and the work is placed in position on the tool and the cutting tool is applied to the work, the resistance set up by the cutter will cause the mandrel to rotate in the work assembly parts until the screws 66 strike the abutting wall 62 to limit the holding pressure of the tool. With this structure so set it is quite apparent that the tool can be used a large number of times for the same type of operation without any material resetting of the parts. A screw plug 90 integral with pin 88 may be fitted into bored hole 76 to secure the pin within the tool assembly.

The wedges 54 are each bored and threaded inwardly from the outer work engaging edge to form recesses 92 which are adapted to receive screws 94 and 96. It will be noted that in Fig. 6 screw 94 is shown extended outwardly from the edge surface of wedge 54 to engage in recess 98 which is formed inwardly into the inner wall of the work W to prevent relative rotation of these parts. The detent 93 mounted in the work enters recess 92 in the wedge member to prevent relative rotation of these parts.

The sleeve 64 is bored and tapped at 100 to present a pair of diametrically opposed threaded holes parallel with the axis of its bore to receive adjusting screws 102 which are adapted to be adjusted from the head stock end of the tool to limit the longitudinal movement of the body member 46 during the work engaging operation. These screws 102 serve the same purpose of limiting the movement of the body member as is provided by screws 66 which are mounted in the body member and are adjustable from the tail stock end of the tool.

When certain work operations are to be performed, such as shown in Fig. 13 it is found convenient to provide threaded holes 104 in the shoulder 32 of the hexagonal section 30 to receive the cap screws 106 to secure the special large sleeve 108 in fixed relation to the mandrel 20. It will be noted that sleeve 108 is recessed at 110 to receive the head of the cap screw below the face 112 of the sleeve. A series of trunnions 114 are mounted in sleeve 108 to extend outwardly from its face 112 at equal radial distances from the center of said sleeve to engage in recesses 116 formed in the end surface of a cylindrical tubular collar 120 to secure it in position against rotation relative to sleeve 108 and in axial alignment relative to the mandrel 20. The member being worked upon in the operation is indicated as W' and comprises a thin ring shaped piece that is to be finished on its periphery C and on both sides A and B. This ring shaped piece is positioned on wedges 54 with face A slightly overlapping notch 56 and the wedges are then moved radially to grip the inner annular surface 122 thereof to normally hold it in position. To better secure the work W' in position during the peripheral cut at C a cylindrical tubular member 124 is positioned against said work at its one end and against a frusto-conical face 126 formed on a sleeve member 128 threaded at 130 to operatively engage the threads 36 of mandrel 20. A lock nut 132 serves to hold member 128 from accidental turning on threads 36. To facilitate easier setting of sleeve 124 radial holes 134 are formed into the body of sleeve 128 to receive an operating bar 136 by means of which the parts may be firmly set.

After the peripheral cut C has been made, the sleeve member 124 is removed and special sleeve holding parts are removed so that the operator will have access to surface A of W' which can be faced its full area since the cutting tool may pass slightly into notch 56 during the cutting operation. After A is faced the holding tool may be loosened on the work which can be reversed so that surface B will be in position for finishing.

The set-up shown in Figs. 15, 16, and 17 is for holding and finishing large parts that need to be assembled in large quantities when the expense of making special tool parts would be justified. The present assembly shown is of a brake drum made up of tubes 138 and 140 of predetermined inner diameters, and a connecting plate 142 which are to be properly welded together at 144 and 146 and then finished on the outside surface 148.

The standard holding tools are not of sufficient size to engage these large parts and it is therefore necessary to provide an offset holding member or jig 150 made of a single piece of metal offset at a right angle to present outer parallel bearing surfaces 152 and 154 to snugly fit the inside contour of tubes 138 and 140 respectively. The inner edge surface of member 150 is grooved at 156 to receive the upper portion of wedge 54 as best shown in Fig. 16. Each wedge may if necessary, be furnished with a member 150. The outer end of tube 140 which extends outwardly beyond body member 46 is shown supported by screws 158 which are mounted in the threaded holes 134 formed in sleeve 128 and secured by lock nuts 160. Holding members 150 are secured in position on wedges 54 by means of cap screws 162 which are operatively fitted into threaded recesses 92 in wedges 54. It is quite apparent that various types of work might be done on the holding tool by simply building jigs of proper form to engage and hold the work parts to be formed or worked on.

Referring now to Figs. 8, 9, 10, 11 and 12 wherein is shown a means for rapid operation of the tool including a split releasing nut, or half nut as generally called. It will be noted that the general structure of the mandrel 20 is substantially the same as shown in the preferred form except that fine threads 164 are provided on tail stock end of the mandrel to facilitate better working of the parts. Also the ball type collar 82 shown in Fig. 6 is used for sliding on the smooth central portion 34 of the mandrel and for engaging the formed portion 81 of body member 46 which carries wedges 54 disposed for radial movement to engage the work W. In the present structure the adjusting screws 102 are adjustable from the head stock end to determine the holding diameter of the wedges 54. The added parts are those mounted on the tail stock end of the mandrel beyond the ball collar 82 and include a half nut structure comprising a sleeve 166 having an enlarged end flange 168 adapted to rest against collar 82 and bored at 170 to slide along the central portion of said mandrel. Rotatably mounted on sleeve 166 is a split nut comprising a solid collar 171 section flanged at its inner end at 172 and secured for limited longitudinal movement on sleeve 166 by an annular cap ring 174 having an inturned flange 176. A helical spring 178 mounted on collar 171 between flanges 172 and 176 serves to exert a pressure that will tend to urge the members 171 and 174 to a fixed longitudinal relation. Cap ring 174 is secured in fixed relation to flange 168 by means of screws 180. Referring to Fig. 12 it will be noted that the collar 171 carries at its outer end a split nut section 182 which is reduced in thickness at 184 to permit flexing and is threaded at 186 to engage threads 164, whereby when the threads are held in operative engagement they may be forcibly moved in relative longitudinal relation.

The outer end portion of section 182 is annularly grooved at 188, also this section is longitudinally slotted at spaced apart intervals as clearly shown at 189.

The outer tubular housing 190 telescopes over collar 171 and is secured tightly thereto by means of screws 192. The outer end section of housing 190 is outwardly flanged to present a suitable hand grip 194. Radial holes 196 formed in said hand grip serve to receive an operating bar by means of which the tool may be set.

An operating sleeve 198 adapted to telescope into housing 190 is provided with an end plug 200 which is bored at 202 to slide fit over screw threads 164 as the sleeve butts against the outer end of a helical spring 203 which is positioned at its other end against collar 171 thus permitting a relatively long longitudinal movement of the sleeve in the collar to operate the half nut. The inner end portion of plug 200 is frusto-conical in shape at 204 to fit into a reverse shaped surface 206 formed in the end of the nut. An annular internal ring 208 positioned inwardly from the outer end of sleeve 198 normally rests on the outer portion of the nut section to hold the nut threads 186 in operative engagement with threads 164 on the mandrel. When the operator forces the operating sleeve inwardly against the action of spring 203, the ring 208 will drop into groove 188 after which surface 204 will engage surface 206 to force the threads 186 from threads 164 thus permitting free sliding movement of the parts on the mandrel for the desired rapid longitudinal adjustment. When the operator releases his grip on the operating sleeve, spring 203 will return the half nut to the locked position so that holding tool may be set to any desired clamping pressure or diameter against the work.

To facilitate proper adjustment and setting of the clamping wedges 54, the housing 190 is circumferentially graduated at 210 so that as the half nut is screwed along the fine threads 164 of the mandrel, the degree of its rotation will be indicated by means of a starting point 212 inscribed on the relatively stationary cap ring 174. For obtaining a finer reading for said setting a vernier scale 214 of the well known type may be provided on cap ring 174 to be read in conjunction with scale 210.

Keys 216 mounted in the inner face of sleeve 166 are adapted to slide in key way 218 formed in the mandrel 20 to prevent relative rotation of the sleeve and the mandrel so that an accurate reading may be had at all times. It will be noted that this key way 218 extends entirely through the length of the threads 164 for the purpose of assembly.

What we claim as new and desire to protect by Letters Patent is:

1. A work holding tool comprising a mandrel having an abutment adjacent its one end, a screw threaded section adjacent its other end, and a relatively long, smooth central section, a body member mounted on said central section, a series of wedges mounted for radial movement in said body member and extending longitudinally therefrom and being in engagement with said abutment at their extended ends, means interconnecting said mandrel and body member to prevent relative rotation and to permit relative longitudinal movement of said parts, a threaded member mounted on the threaded portion of said mandrel operable to force said body member along said wedges whereby the wedges are forced radially apart to engage work mounted thereon, and recesses formed in said wedges adapted to receive detents therein which extend inwardly from the inner wall of the work as said wedges are moved radially to engage the work.

2. A work holding tool comprising a mandrel having an abutment adjacent its one end, a screw threaded section adjacent its other end, and a relatively long, smooth central section, a body member mounted on said central section, a series of wedges mounted for radial movement in said body member and extending longitudinally therefrom and being in engagement with said abutment at their extended ends, means interconnecting said mandrel and body member to prevent relative rotation and to permit relative longitudinal movement of said parts, a threaded member mounted on the threaded portion of said mandrel operable to force said body member along said wedges whereby the wedges are forced radially apart to engage work mounted thereon, and detents projecting outwardly from said wedges adapted to enter recesses formed in the body of said work as said wedges are moved outwardly to the work engaging position.

3. A work holding tool comprising a mandrel having an abutment adjacent its one end, a screw threaded section adjacent its other end, and a relatively long, smooth central section, a body member mounted on said central section, a series of wedges mounted for radial movement in said body member and extending longitudinally therefrom and being in engagement with said abutment at their extended ends, means interconnecting said mandrel and body member to prevent relative rotation and to permit relative longitudinal movement of said parts, a threaded member mounted on the threaded portion of said mandrel operable to force said body member along said wedges whereby the wedges are forced radially apart to engage work mounted thereon, and adjustable stop screws mounted in said body member in parallel relation to the axis of said mandrel to limit the longitudinal movement of said body member.

4. A work holding tool comprising a mandrel having an abutment adjacent its one end, a screw threaded section adjacent its other end, and a relatively long, smooth central portion, a body member mounted for longitudinal sliding movement on said central section, a series of wedges mounted slidably in tapered longitudinal slots formed in the peripheral surface of said body member and bearing at one end against said abutment, and a nut mounted on the threaded portion of said mandrel and operable to force said body member along said wedges, whereby said wedges are radially expanded to engage work mounted thereabout, each of said wedges having tapped recesses formed in the outer edge thereof for receiving detents interconnecting said wedges to said work or to permit attachment of wedge extensions.

5. The structure as recited in claim 4 with the addition of means interconnecting said nut to said body member whereby to prevent relative rotation thereof.

6. The structure as recited in claim 4 with the addition of means interconnecting said nut to said body member whereby to prevent relative rotation thereof, said interconnecting means comprising a rod parallel to but spaced apart from said mandrel, one end of said rod being secured releasably in said nut and the other end of said rod projecting into a recess formed in said body member.

References Cited in the file of this patent

UNITED STATES PATENTS

| | | |
|---|---|---|
| 1,468,270 | Kent | Sept. 18, 1923 |
| 1,527,866 | Hall | Feb. 24, 1925 |
| 1,654,737 | Kistner | Jan. 3, 1928 |
| 1,777,316 | Kuffner | Oct. 7, 1930 |
| 1,873,515 | Warren | Aug. 23, 1932 |
| 1,919,239 | McFall | July 25, 1933 |
| 2,487,504 | Yelkin | Nov. 8, 1949 |
| 2,518,508 | Van Bever | Aug. 15, 1950 |
| 2,659,260 | Layne | Nov. 17, 1953 |

FOREIGN PATENTS

| | | |
|---|---|---|
| 184,248 | Germany | May 1, 1907 |